US006575285B2

(12) United States Patent
Jong

(10) Patent No.: US 6,575,285 B2
(45) Date of Patent: Jun. 10, 2003

(54) SAFETY SWITCH FOR POWER TOOLS

(75) Inventor: Jung-Chang Jong, Chungli (TW)

(73) Assignee: Jenn Feng Industrial Co., Ltd. (TW)

( * ) Notice: Subject to any disclaimer, the term of this patent is extended or adjusted under 35 U.S.C. 154(b) by 0 days.

(21) Appl. No.: 09/992,648

(22) Filed: Nov. 14, 2001

(65) Prior Publication Data

US 2003/0089575 A1 May 15, 2003

(51) Int. Cl.[7] .................................................. F16P 3/18

(52) U.S. Cl. ..................... 192/131 R; 30/381; 56/10.5; 83/DIG. 1; 192/69.8

(58) Field of Search ........................... 192/131 R, 69.8; 30/381; 56/10.5; 83/DIG. 1; 74/491, 523

(56) References Cited

U.S. PATENT DOCUMENTS

| | | | | |
|---|---|---|---|---|
| 4,152,833 A | * | 5/1979 | Phillips | 30/382 |
| 4,335,514 A | * | 6/1982 | Overy et al. | 30/382 |
| 4,432,139 A | * | 2/1984 | Kohler et al. | 30/381 |
| 4,594,780 A | | 6/1986 | Schliemann et al. | 30/382 |
| 4,680,862 A | * | 7/1987 | Wieland et al. | 30/381 |
| 4,753,012 A | * | 6/1988 | Schurr | 30/382 |
| 5,065,476 A | | 11/1991 | Dohse et al. | 16/114 R |
| 5,243,764 A | | 9/1993 | Wieland | 30/383 |
| 5,709,032 A | * | 1/1998 | Mizutani et al. | 30/382 |
| 5,724,737 A | * | 3/1998 | Stones | 30/228 |

* cited by examiner

*Primary Examiner*—Saúl Rodríguez
(74) *Attorney, Agent, or Firm*—Ostrolenk, Faber, Gerb & Soffen, LLP

(57) ABSTRACT

A clutch safety switch of a power chainsaw includes a safety member slidably connected to the casing and a trigger which is not able to be squeezed when the safety member is not slid away. A gear connected to the power source has engaging recesses and a clutch device member is rotatably mounted to an output shaft which is independent from the gear. A link is connected between the safety member and a plate connected to the clutch member which is rotated to engage the output shaft with the gear by sliding the safety member. A lever is connected to the plate which is pivoted by pushing the lever to allow the link to move in a horizontal portion of an L-shaped slot in the plate to make the safety member be pushed back to disengage the clutch device from the gear to release the connection.

5 Claims, 5 Drawing Sheets

SAFETY SWITCH FOR POWER TOOLS

FIELD OF THE INVENTION

The present invention relates to a switch for a chainsaw wherein the power cannot be engaged with the chainsaw by pushing a lever to a remote position.

BACKGROUND OF THE INVENTION

A conventional switch device for a power tool generally includes a trigger which is engaged with a trigger assembly. When pulling the trigger, the circuit of the power tool is activated and the tool is operated. However, most of the triggers have no safety device to avoid the user to touch the trigger unintentionally so that it is possible that the trigger is pulled unintentionally and the chainsaw for example is running. This is extremely dangerous so that there is a need to develop a safety device to prevent the situation from happening.

SUMMARY OF THE INVENTION

In accordance with one aspect of the present invention, there is provided a clutch safety switch for a power tool and the clutch safety switch comprises a casing having a slot for a safety member slidably engaged therewith. A lug extends from an underside of the safety member and a trigger is pivotally located in the casing and has a protrusion which is interfered by the lug of the safety member. A link has an end thereof connected to the safety member. A gear is received in the casing and connected to a power source. The gear is independently mounted to an output shaft and a plurality of engaging recesses are defined in the gear. A plurality of guide rods and guide members respectively extend from an inside of the casing. A clutch member is mounted to the output shaft and has a plurality of blades each of which has a guide slot in which respective one of the a plurality of guide rods extends. Each blade has a tapered extension extending therefrom which is able to be movable along the guide member. An engaging member is movably mounted to the output shaft and has bosses extending from a side thereof. A cover is fixed on the clutch member and the engaging member is retained in a central hole in the clutch member by the cover. A link is connected between the safety member and a plate connected to one of the blades of the clutch member. The plate has an L-shaped slot so as to receive an end of the link. A spring has one end thereof connected to the plate and the other end of the spring is fixed to a rod in the casing. A lever is pivotally connected to the casing and an extension is connected to the lever. The extension has a first elongate slot and a second elongate slot. Two pins in the casing are located in the first elongate slot and a position rod extending from the plate is movably engaged with the second elongate slot.

The primary object of the present invention is to provide a clutch safety switch for a power tool wherein the clutch device disengage the power from the output shaft by pushing a lever on the casing.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
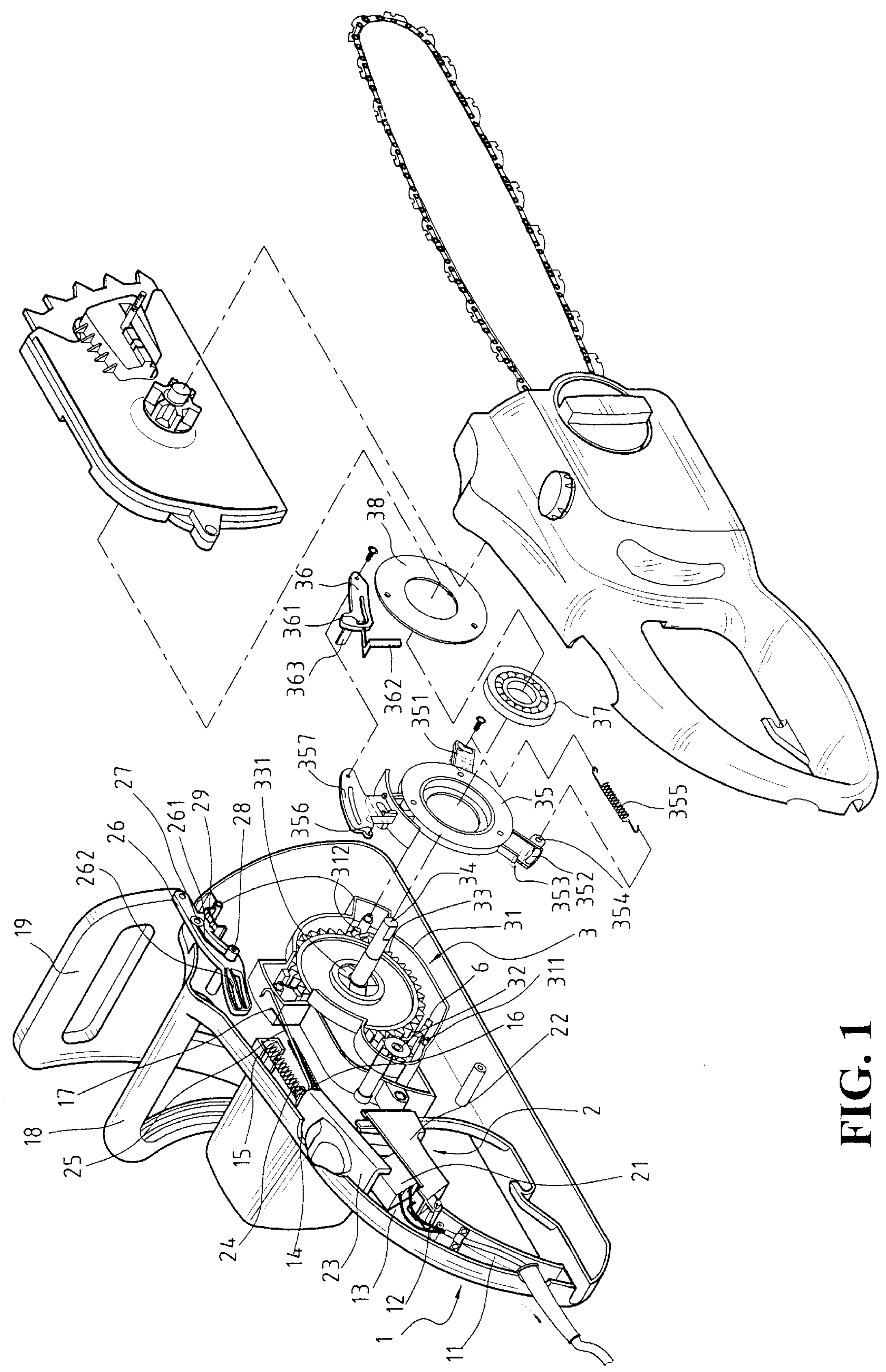
FIG. 1 is an exploded view to show a clutch safety device of a power chainsaw of the present invention.
Figure 2:
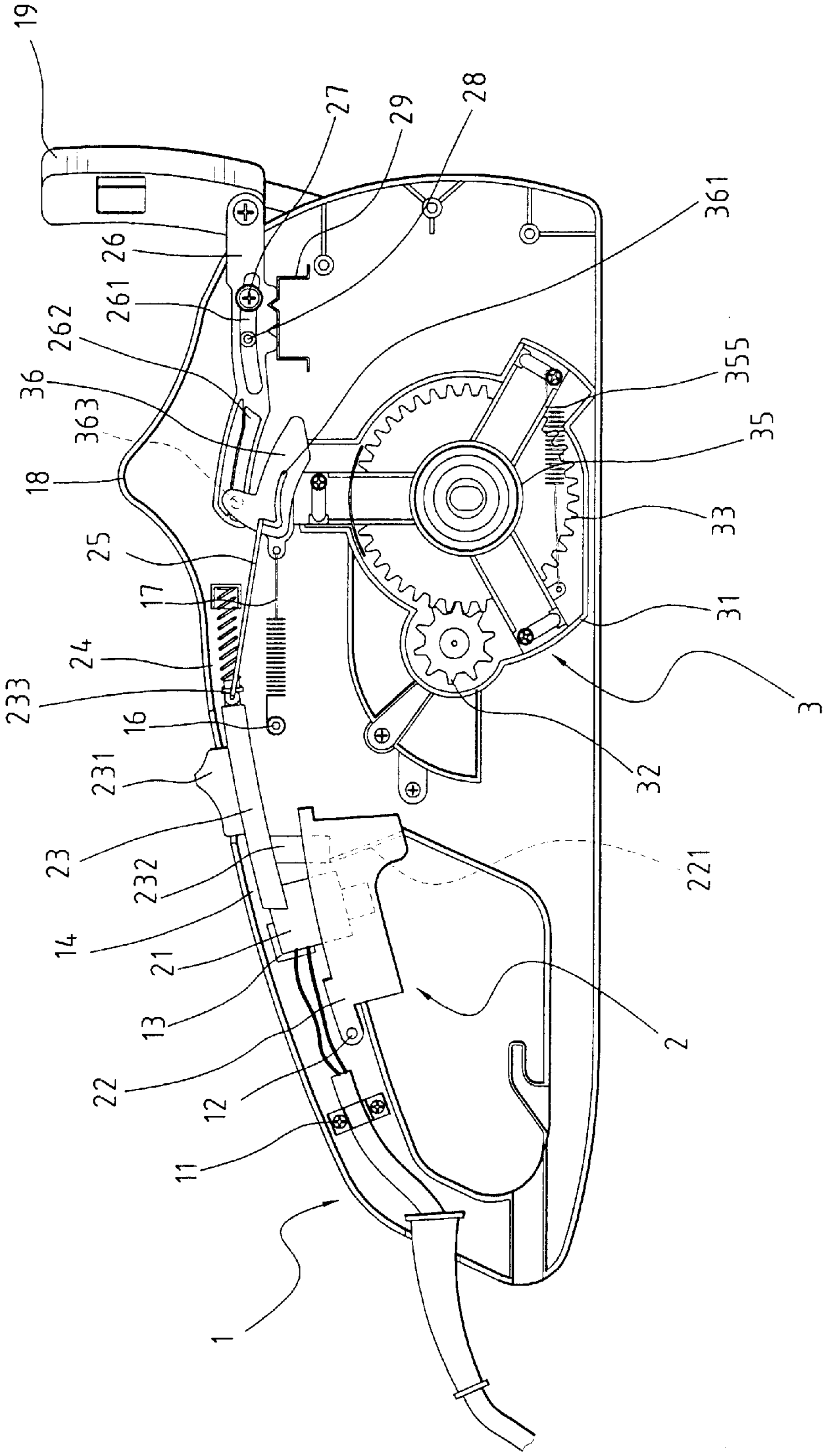
FIG. 2 is a side view to show the clutch safety device of the present invention.

Referring to FIGS. 1 and 2, the clutch switch device of the present invention comprises a casing 1, a trigger assembly 2 and a clutch device 3. The casing 1 includes a handle 11 of the power chainsaw and a pin 12 for pivotally connecting the trigger assembly 2 extends from an inside of the casing 1. An activation switch frame 13 is connected above the trigger assembly 2. A rod 16 is located in the casing 1 and a spring 17 has one end thereof connected to the rod 16. The trigger assembly 2 includes an activation switch 21 which is received in the activation switch frame 13 and a trigger 22 which has a protrusion 221 and is pivotally mounted to the pin 12. A slot 14 is defined through the casing 1 so that a safety member 23 is slidably engaged with the slot 14 and a stop member 15 located at a closed end of the slot 14. A thumb portion 231 extends from the safety member 23 and through the slot 14, a lug 232 extending from an underside of the safety member 23 so that when the protrusion 221 contacts the lug 232, the trigger 22 cannot be squeezed. The safety member 23 has a head 233 and a link 25 is connected to the head 233. A spring 24 has one end connected to the head 233 and the other end of the spring 24 is connected to the stop member 15. The clutch device 3 includes a first gear 32 which is connected to a power source such as a motor (not shown) and a clutch device casing 31 for an output shaft 34 extending therefrom. A second gear 33 is located in the clutch device casing 31 and engaging recesses 331 is defined in a central portion of the second gear 33. The second gear 33 and the output shaft 34 are two independent members which are not connected with each other. A clutch member 35 has three blades 351 extending radially outward therefrom at equal intervals and the output shaft 34 extends through a central hole of the clutch member 35. A guide slot 352 is defined in a remote end of each of the blades 351 and a tapered extension 353 extends from each of the blades 351. Three guide rods 311 and three guide members 312 extend from the clutch device casing 31. The guide rods 311 are received in the guide slots and the guide members 312 are shaped to cooperate with the tapered extensions 353. A spring 355 has one end connected to a hole 354 defined in one of the three blades 351 and the other end of the spring 355 is connected to a guide rod 311 in one of the guide slots 352. A pushing portion 357 is connected a remote end of one of the blades 351 and has a hole 356 for being connected to the other end of the spring 17. A plate 36 is connected to the pushing portion 357 and has an L-shaped slot 361 for receiving the other end of the link 25. The link 25 is engaged with a vertical portion of the L-shaped slot 361. A support plate 362 is connected to the plate 36 so as to prevent the link 25 from dropping from the L-shaped slot 361. An engaging member 37 has bosses 371 on a side and is movably mounted to the output shaft 34. A cover 38 is mounted to the output shaft 34 and fixed to the clutch member 35 so that the engaging member 37 is retained in the central hole of the clutch member 35. When the bosses 371 are engaging with the engaging recesses 331 in a central portion of the second gear 33, the output shaft 34 is driven by the second gear 33. A plurality of rollers are embedded in the engaging member 37 so as to reduce the frictional wear between the cover 38 and the engaging member 37.

A lever 19 is pivotally connected to the casing 1 and an extension 26 is connected to the lever 19. The extension 26 has a first elongate slot 261 and a second elongate slot 262. Two pins 27, 28 extending from the inside of the casing 1 are located in the first elongate slot 261 so as to guide the direction of movement of the extension 26 when the lever 19 is pushing away from the handle 18 on the top of the casing 1. A position rod 363 extends from the plate 36 and is movably engaged with the second elongate slot 262. A frame 29 is located in the casing 1 and below the extension 26 and has a tip portion extending therefrom. A plurality of notches are defined in an underside of the extension 26 and the tip portion is engaged with one of the notches.

Figure 4B:
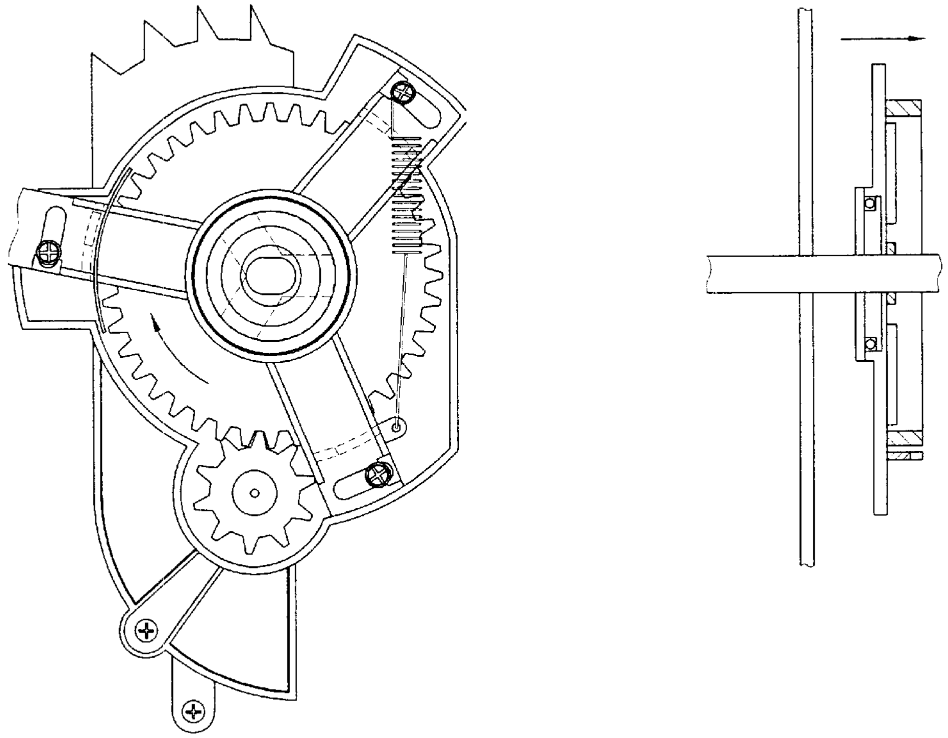
FIG. 4B shows that the engaging member is moved to engage with the clutch member of the clutch safety device of the present invention.
Figure 4A:
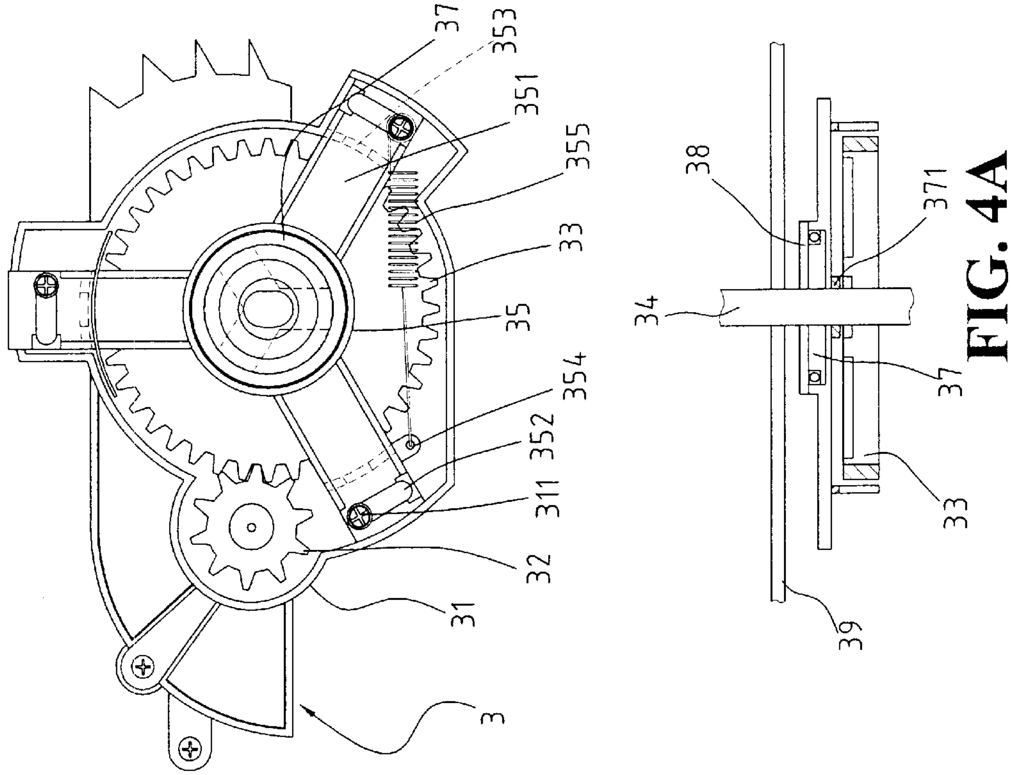
FIG. 4A shows that the engaging member is not yet moved to engage with the clutch member of the clutch safety device of the present invention.

As shown in FIGS. 2 and 4A, when the safety member 23 is not slid toward the chainsaw, the protrusion 221 contacts the lug 232 so that the trigger 22 cannot be squeezed.

Figure 3:
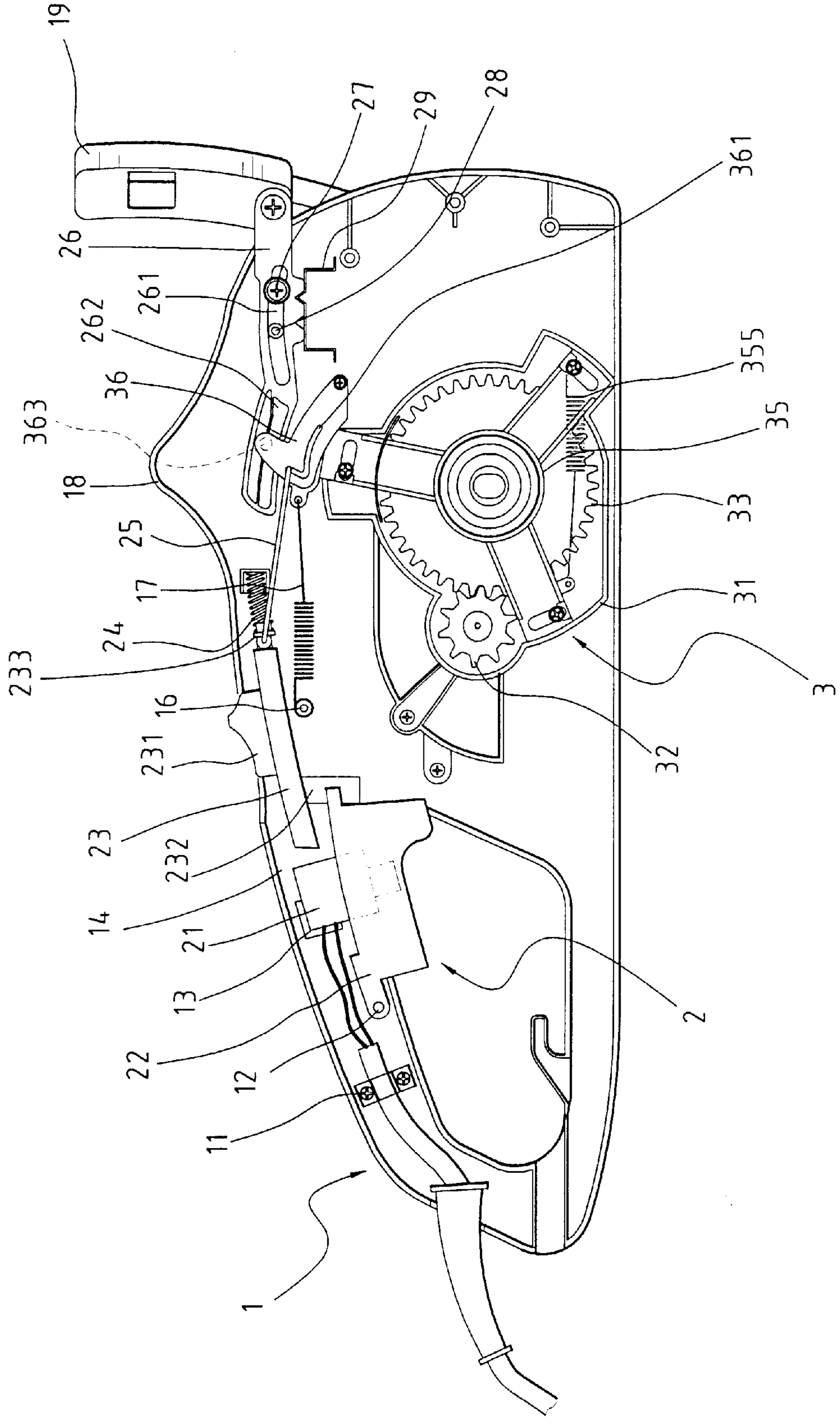
FIG. 3 is a side view to show the clutch safety device of the present invention wherein the clutch member is rotated by sliding the safety member.

As shown in FIGS. 3 and 4B, the lever 19 is positioned at the position where the tip portion is engaged with the notch on the right end of the frame 29, and the safety member 23 is pushed to remove the lug 232, the trigger 22 can be squeezed to activate the activation switch 21 to operate the chainsaw. In the meanwhile, the spring 24 is compressed when the safety member 23 is pushed and the link 25 pushes the plate 36 so as to let the clutch member 35 rotate clockwise. The rotation of the clutch member 35 and its blades 351 make the tapered extensions 353 to move along the guide members 312 to let the bosses 371 move and engage with the engaging recesses 331 as shown in FIG. 4B. Therefore, the power can be transferred from the second gear 33 to the output shaft 34 to drive the chainsaw.

When releasing the trigger 22, the activation switch 21 is released and the safety member 23 is moved back by the spring 24. The springs 17 and 355 pull the clutch member 35 to rotate counter clockwise and the bosses 371 are disengaged from the engaging recesses 331. The power is then not transferred to the output shaft 34 and the chainsaw stops.

Figure 5:
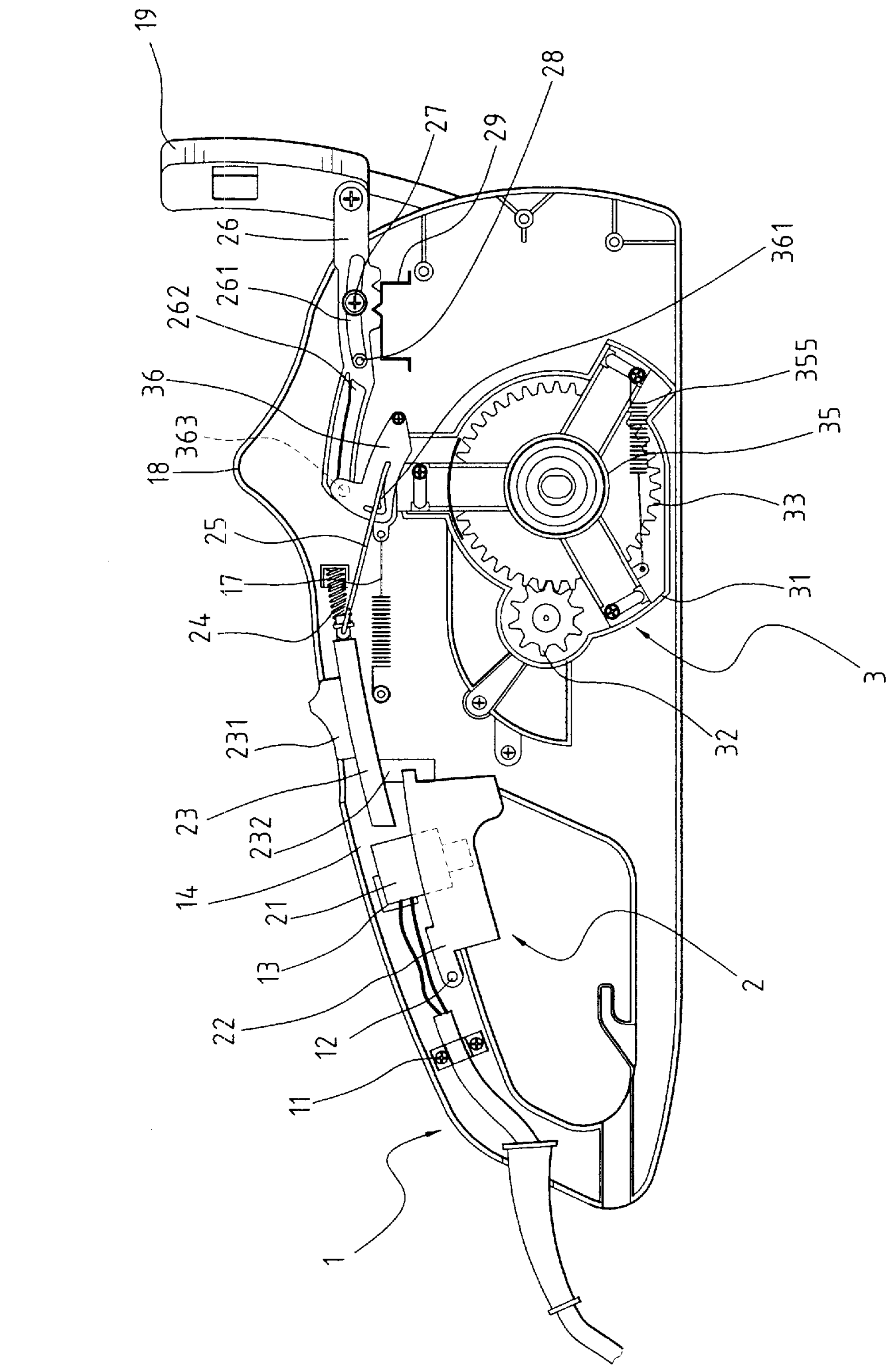
FIG. 5 shows that the link is located in a horizontal of the L-shaped slot in the plate when pushing the lever.

As shown in FIG. 5, when pushing the lever 19 to a remote position to let the tip portion engage with the notch on the left end of the frame 29, the distal end of the extension 26 lifts the plate 36 upward to let the link 25 be located in the horizontal portion of the L-shaped slot 361. In other words, the link 25 can be freely moved within the horizontal portion of the L-shaped slot 361. Therefore, the safety member 23 can not be positioned as the position shown in FIG. 3 and the safety member 23 will be pushed back to its original position by the spring 24. The trigger 22 is not able to be squeezed to operate the chainsaw. This lever 19 ensures that the chainsaw will not be operated unintentionally even if the safety member 23 is unintentionally slid.

While we have shown and described the embodiment in accordance with the present invention, it should be clear to those skilled in the art that further embodiments may be made without departing from the scope of the present invention.

What is claimed is:

1. A safety switch for a power tool, comprising:

a casing having a slot defined therethrough and a safety member slidably engaged with said slot, a lug extending from an underside of said safety member, a trigger pivotally located in said casing and having a protrusion which is interfered by said lug of said safety member, a spring having one end thereof connected to said safety member and the other end of said spring connected to a stop member in said casing, a link having an end thereof connected to said safety member;

a gear received in said casing and adapted connected to a power source, said gear independently mounted to an output shaft and a plurality of engaging recess defined in said gear, a plurality of guide rods and guide members respectively extending from an inside of said casing;

a clutch member mounted to said output shaft and having a plurality of blades each of which has a guide slot in which respective one of said a plurality of guide rods extends, each blade having a tapered extension extending therefrom which is able to be movable along said guide member, an engaging member movably mounted to said output shaft and having bosses extending from a side thereof, a cover fixed on said clutch member and said engaging member being retained in a central hole in said clutch member by said cover;

one of said blades having a plate connected thereto and said plate having an L-shaped slot, the other end of said link engaged with said L-shaped slot in said plate, another spring having one end thereof connected to said plate and the other end of said another spring fixed to one of said plurality of guide rods in said casing, and a lever pivotally connected to said casing and an extension connected to said lever, said extension having a first elongate slot and a second elongate slot, two pins extending from said inside of said casing and located in said first elongate slot, a position rod extending from said plate and movably engaged with said second elongate slot.

2. The safety switch as claimed in claim 1, wherein a frame located in said casing and has a tip portion extending therefrom, a plurality of notches defined in an underside of said extension and said tip portion engaged with one of said notches.

3. The safety switch as claimed in claim 1, wherein a spring has one end thereof connected to one of said blades and the other end of said spring is connected to one of said guide rods in said guide slot of one of the rest of said blades.

4. The safety switch as claimed in claim 1, wherein a plurality of rollers are embedded in said engaging member and said cover contacts said rollers.

5. The safety switch as claimed in claim 1, wherein a thumb portion extends from said safety member and through said slot.

* * * * *